(12) United States Patent  
Dutcher et al.

(10) Patent No.: US 12,436,039 B2  
(45) Date of Patent: Oct. 7, 2025

(54) THERMOCOUPLE SENSOR ASSEMBLY

(71) Applicant: WIKA Alexander Wiegand SE & Co. KG, Klingenberg/Main (DE)

(72) Inventors: Dale Eugene Dutcher, Kingwood, TX (US); Michael Strebel, League City, TX (US)

(73) Assignee: Wika Alexander Wiegand SE & Co. KG, Klingenberg (DE)

(*) Notice: Subject to any disclaimer, the term of this patent is extended or adjusted under 35 U.S.C. 154(b) by 850 days.

(21) Appl. No.: 17/554,754

(22) Filed: Dec. 17, 2021

(65) Prior Publication Data

US 2022/0196484 A1 Jun. 23, 2022

Related U.S. Application Data

(60) Provisional application No. 63/192,855, filed on May 25, 2021, provisional application No. 63/127,579, filed on Dec. 18, 2020.

(51) Int. Cl.
*G01K 7/02* (2021.01)
*G01K 1/08* (2021.01)
*H10N 10/01* (2023.01)
*H10N 10/10* (2023.01)
*H10N 10/17* (2023.01)
*H10N 10/80* (2023.01)

(52) U.S. Cl.
CPC .......... *G01K 7/02* (2013.01); *G01K 1/08* (2013.01); *H10N 10/01* (2023.02); *H10N 10/10* (2023.02); *H10N 10/17* (2023.02); *H10N 10/80* (2023.02)

(58) Field of Classification Search
CPC .......... G01K 7/02; G01K 1/143; H10N 10/01; H10N 10/10; H10N 10/17; H10N 10/80
See application file for complete search history.

(56) References Cited

U.S. PATENT DOCUMENTS

| | | | | |
|---|---|---|---|---|
| 3,143,439 A | * | 8/1964 | Hansen | G01K 1/143 |
| | | | | 374/E1.019 |
| 3,901,080 A | * | 8/1975 | Hilborn | G01K 7/04 |
| | | | | 374/E1.019 |
| 3,939,554 A | * | 2/1976 | Finney | G01K 1/143 |
| | | | | 374/E1.019 |

(Continued)

FOREIGN PATENT DOCUMENTS

| | | | |
|---|---|---|---|
| JP | H07286907 A | | 10/1995 |
| JP | 2018141709 A | | 9/2018 |
| WO | WO-2018047296 A1 | * | 3/2018 ............... G01K 7/04 |

OTHER PUBLICATIONS

European Search Report dated May 13, 2022 in corresponding application 21215402.5.

*Primary Examiner* — Jeffrey T Carley
*Assistant Examiner* — Jose K Abraham
(74) *Attorney, Agent, or Firm* — Muncy, Geissler, Olds & Lowe, P.C.

(57) ABSTRACT

A thermocouple assembly for surface temperature measurement, comprising a sheathed thermocouple sensor cable, a positioning pad, receiving and/or securing a thermocouple sensor end at a desired measuring point, an insulation body, and a shielding, wherein the positioning pad is mechanically connected to the shielding. Additionally methods for the installation of a thermocouple assembly are also provided.

14 Claims, 13 Drawing Sheets

(56) References Cited

U.S. PATENT DOCUMENTS

| | | | | | |
|---|---|---|---|---|---|
| 4,043,200 | A | * | 8/1977 | Finney | G01K 7/06 |
| | | | | | 374/E1.019 |
| 5,172,979 | A | * | 12/1992 | Barkley | H10N 10/17 |
| | | | | | 374/E1.019 |
| 5,382,093 | A | * | 1/1995 | Dutcher | G01K 1/143 |
| | | | | | 374/E1.019 |
| 5,438,866 | A | * | 8/1995 | McQueen | G01F 23/248 |
| | | | | | 73/204.25 |
| 5,711,608 | A | * | 1/1998 | Finney | G01K 7/02 |
| | | | | | 374/E7.004 |
| 5,746,513 | A | * | 5/1998 | Renken | G01K 13/00 |
| | | | | | 374/179 |
| 5,864,282 | A | * | 1/1999 | Hannigan | G01K 7/16 |
| | | | | | 174/74 A |
| 5,993,061 | A | * | 11/1999 | Drouet | G01K 1/143 |
| | | | | | 374/E1.019 |
| 5,999,081 | A | * | 12/1999 | Hannigan | G01K 1/16 |
| | | | | | 374/185 |
| 6,063,234 | A | * | 5/2000 | Chen | G01K 7/00 |
| | | | | | 374/161 |
| 6,158,886 | A | * | 12/2000 | Dutcher | G01K 1/143 |
| | | | | | 374/E1.019 |
| 6,761,480 | B2 | * | 7/2004 | Parnicza | G01K 7/02 |
| | | | | | 374/E7.004 |
| 8,870,455 | B2 | | 10/2014 | Daily et al. | |
| 10,481,010 | B2 | * | 11/2019 | Yamana | G01K 1/08 |
| 12,000,737 | B2 | * | 6/2024 | Kida | G01K 1/16 |
| 2014/0376594 | A1 | * | 12/2014 | Daily | G01K 1/026 |
| | | | | | 374/179 |
| 2015/0114443 | A1 | * | 4/2015 | Berkland | G01K 1/08 |
| | | | | | 136/233 |
| 2019/0234804 | A1 | * | 8/2019 | Yamana | G01K 1/14 |

\* cited by examiner

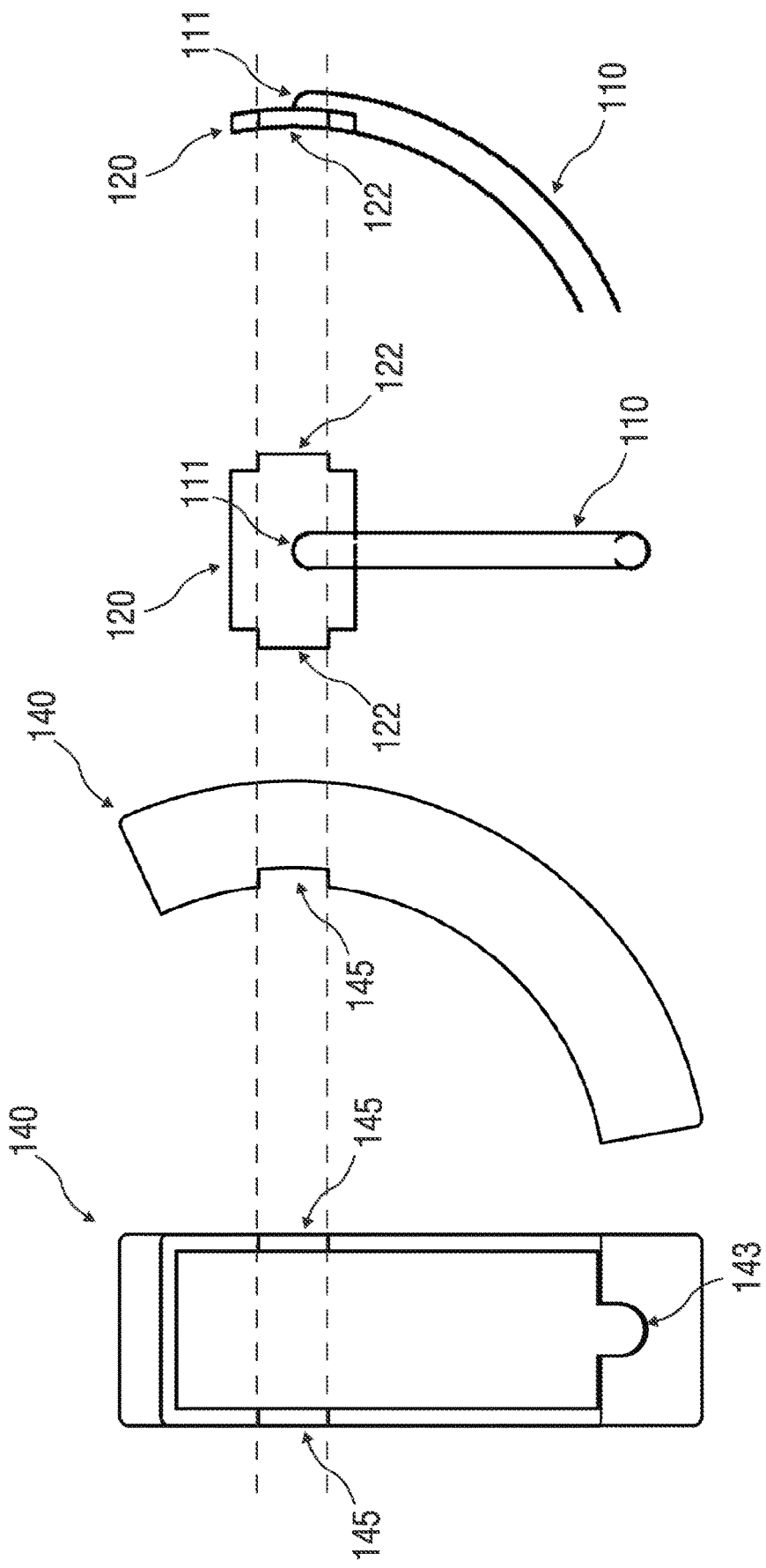

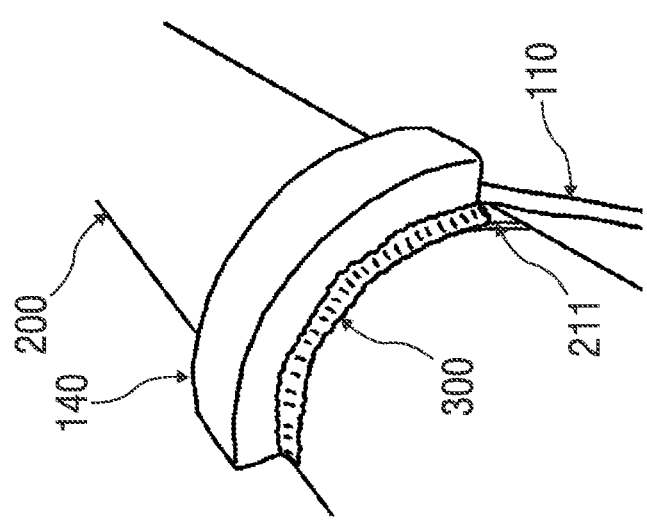
FIG 9.1
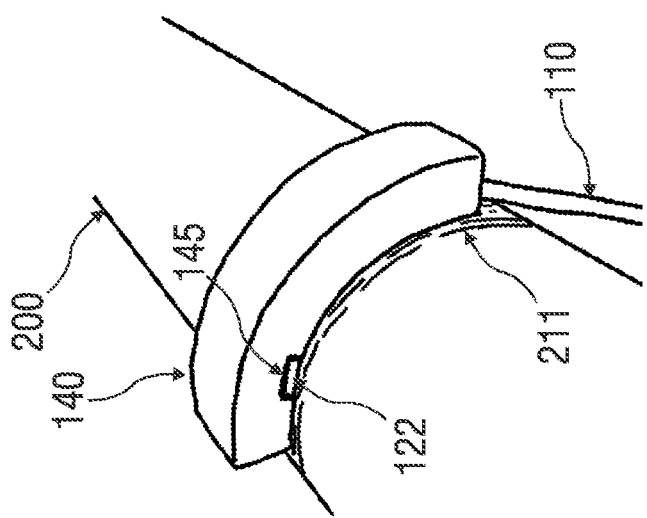
FIG 9.2
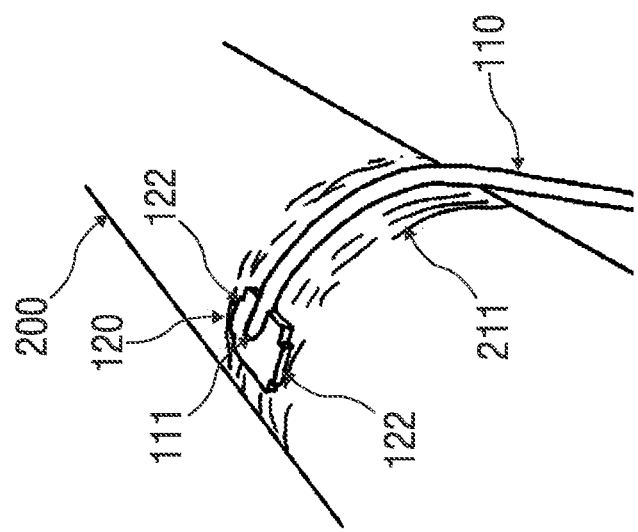
FIG 9.3

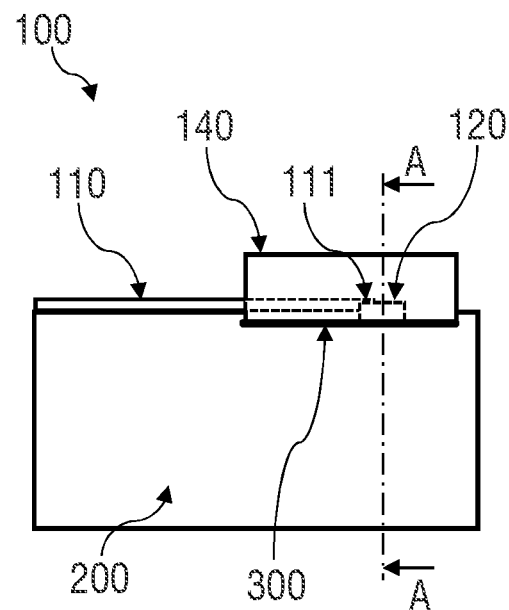
FIG 10.1
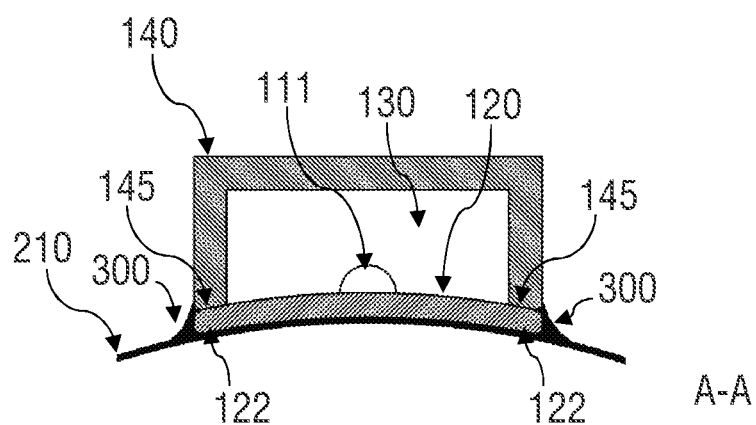
FIG 10.2

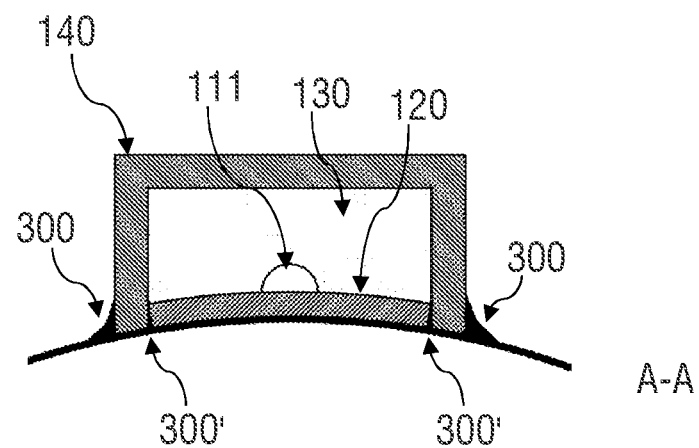
FIG 10.3
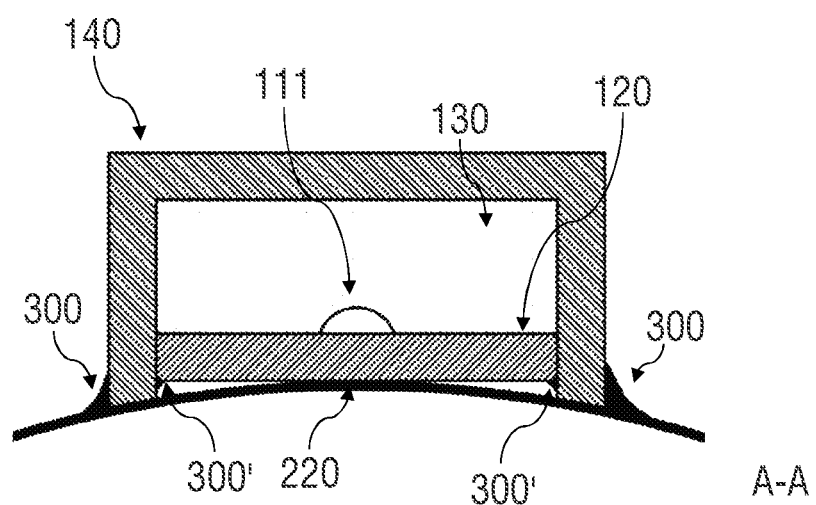
FIG 10.4

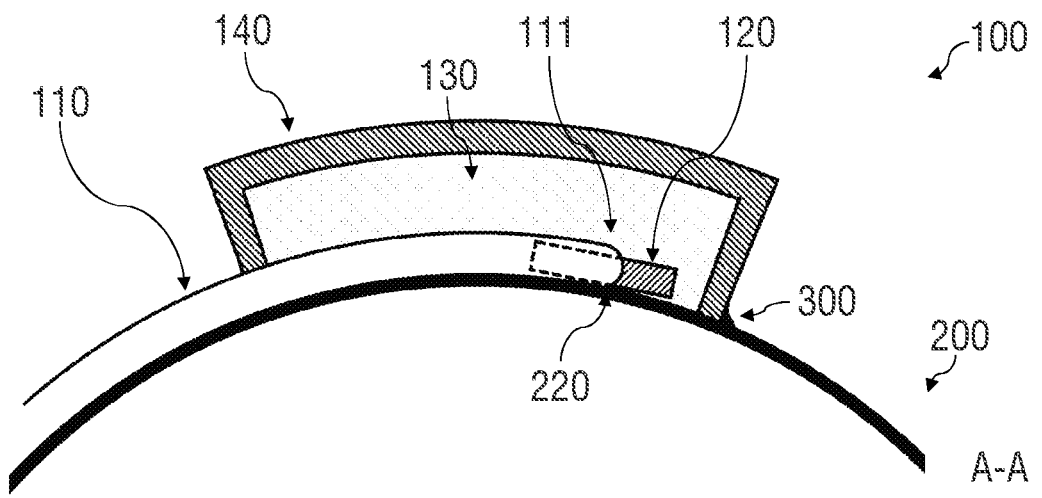
FIG 11
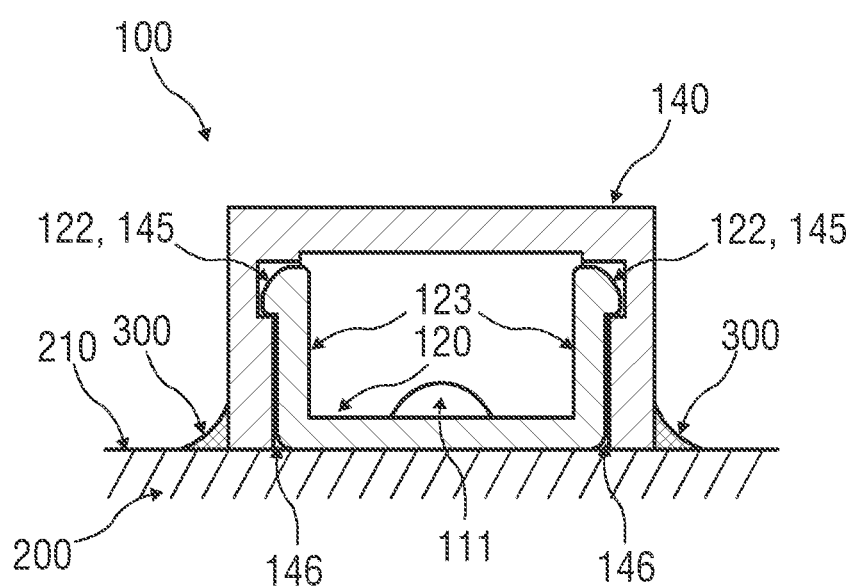
FIG 12.1

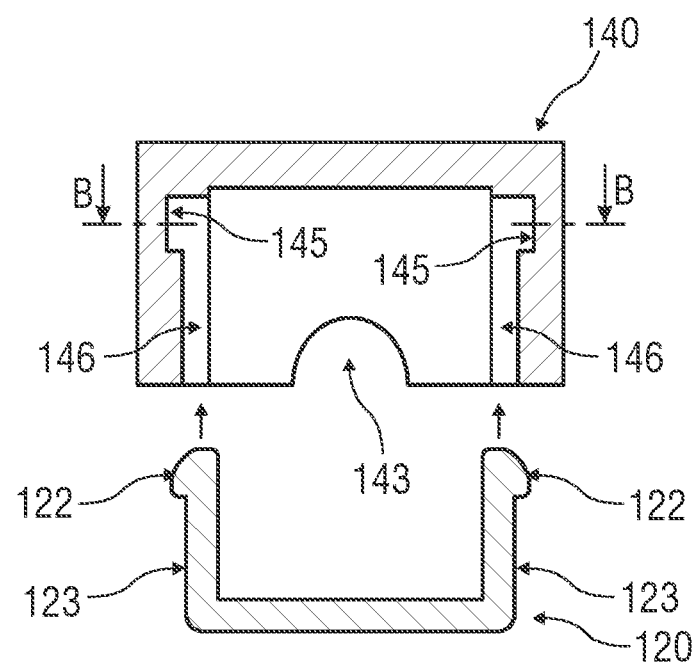
FIG 12.2
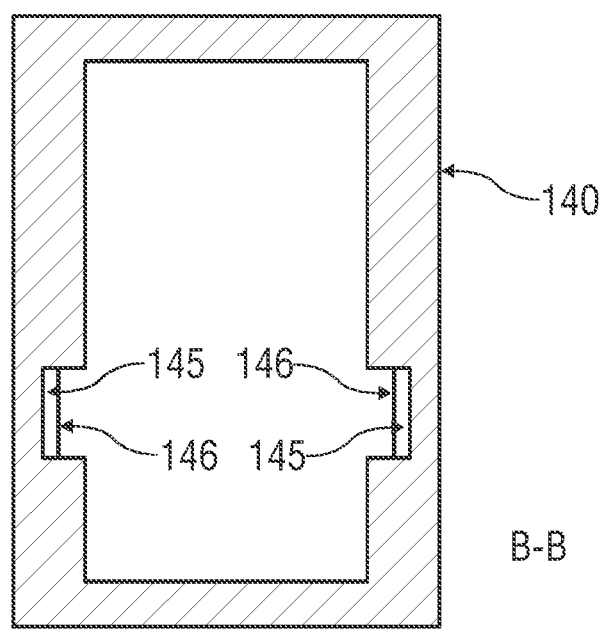
FIG 12.3

THERMOCOUPLE SENSOR ASSEMBLY

This nonprovisional application claims priority to U.S. Provisional Application No. 63/127,579, which was filed on Dec. 18, 2020, and to U.S. Provisional Application No. 63/192,855, which was filed on May 25, 2021, and are herein incorporated by reference.

BACKGROUND OF THE INVENTION

Field of the Invention

The present invention relates to a thermocouple assembly for surface temperature measurement.

The invention further relates to methods for installation of a thermocouple assembly.

Description of the Background Art

Sheathed thermocouple (TC) sensor cables are known in the prior art for their accuracy and fast response time in temperature measurement applications. They are therefore often used for temperature measurement in industrial processes. Such sensor cables typically comprise at least two conductors of different material, which extend along the length of the cable. The conductors are embedded in an electrical insulation material, typically a mineral powder insulation. The conductors and insulation are enclosed by a metal sheath. Because of the mineral insulation material, such sheathed thermocouple sensor cables are sometimes also referred to as mineral insulated (MI) cables. The distal ends of these conductors are joined at a location close to or directly at a closed distal end of the sensor cable sheath, thereby forming a thermocouple junction.

When thermocouple sensors are used to measure the temperature at the surface of tubes, pipes or conduits or flat surfaces of objects inside of a furnace, reactor or the like, the thermocouple is exposed to extreme heat and/or other harsh environmental influences. To protect the sensor, it is known in the prior art to protect such tube skin thermocouples (TSTC) with a thermal insulation material and a shielding. The thermocouple assembly including the sheath gets exposed to high temperature in installations inside or outside the heater; in those cases the purpose of the shield and the insulation is to secure the measuring junction at a specified location on the tube and also to act as a composite medium to distribute the heat between a hot and a cold side to read the actual tube skin temperature at the thermocouple junction in a repeatable manner. There may be certain applications where the measuring junction is hotter than the environment, for example cases where the assembly is attached to a hot tube in a cold atmosphere and where the functionality of the shield and insulation may be to prevent heat loss along with other functionality discussed above.

The installation process for such designs, as widely accepted in the industry, requires two steps: In a first step, the thermocouple sensor cable is connected to the desired measurement point with a so called weld pad. The weld pad is attached to the surface of the tube or object to be measured by welding. The thermocouple sensor cable may be integrally formed with the weld pad or may be detachably mountable to the weld pad. In a second step, the insulation material is placed upon the thermocouple sensor cable; sensor and insulation are covered by a metal shielding which is fixed to the surface by a second welding process.

This two-step process has some disadvantages, because mistakes during the installation are likely to result in reduced measurement accuracy, and temperature reading offset. Also, in certain cases, while measurement accuracy is initially achieved, poor installation methods can also result in degraded readings over time.

SUMMARY OF THE INVENTION

The objects of the invention are therefore directed towards improving a thermocouple sensor design by reducing susceptibility to errors of the installation process and improve measuring characteristics of a thermocouple sensor assembly.

The objects of the invention are achieved, in an exemplary embodiment by a thermocouple assembly for temperature measurement on or at the surface of a structure, that comprises a sheathed thermocouple sensor cable, a positioning pad for receiving and/or securing the thermocouple sensor end at a desired measuring point on or close to the surface, a shielding, covering at least a part of the positioning pad and at least a part of the sheathed thermocouple sensor cable and an insulation body, filling the inner free volume of the shielding, wherein the positioning pad is mechanically connected to the shielding, i.e. at least the shielding and the positioning pad are rigidly connected or connectable to each other, or are made in a one-piece design.

The mechanical connection of shielding and positioning pad provides numerous advantages, a exemplified below.

Installation of the thermocouple sensor assembly is significantly simplified, in comparison with state-of-the-art assemblies with a shielding and separate weld pad. The shielding and mechanically connected positioning pad may be fixed to the structure in one step, e.g. by one single welding process or by other means, such as clamping or screwing. Therefore, installation time and costs are significantly reduced, especially, because after the one and only welding process, also only one inspection of the welding area is required.

Furthermore, as the positioning pad receives and/or secures the closed thermocouple sensor cable end, i.e. the sensitive measuring tip (also referred to as the distal end or closed end of the sheathed thermocouple sensor cable), in a defined location, the thermocouple sensor cable end is also positioned in a defined location relative to the shielding. Especially, the thermocouple sensor cable end might be positioned along a central longitudinal axis of the shielding. Non-central positioning of the sensor end, as it can easily occur with lack of caution during the two-step installation process of state-of-the-art thermocouple sensor assemblies, is effectively prevented. This may increase repeatability, long-term stability and accuracy of the measurement.

To receive the sensor cable end at a desired measuring point, in an example, the positioning pad can comprise a receiver, which may be formed by a slot or a recess corresponding to the shape and size of the sensor cable end, to receive the thermocouple sensor cable end therein. The sensor cable end may be withdrawable from the receiver. The sheathed thermocouple sensor cable may be fixed to the structure, after the insertion of the sensor cable into the shielding and the receiver of the positioning pad, by other means, e.g. by a positioning tube clip that is welded to the structure. Such an arrangement allows an easy replacement of the sheathed thermocouple sensor cable without the need to remove the shielding from the structure.

To secure the sensor cable end at a desired measuring point, in an exemplary embodiment of the thermocouple assembly, the positioning pad comprises a receiver, which may be formed by a slot or a recess that corresponds to the shape of the sensor cable end, but has a smaller size to provide a stronger mechanical fit, e.g. an interference fit, when the thermocouple sensor cable end is pushed into the receiver. Alternatively, the thermocouple sensor cable end may be secured to the positioning pad by welding, clamping, screws or other ways. In such an arrangement the thermocouple sensor cable might not be easily replaced. However, the installation will be very robust and the installation is further simplified as tube clips may not be necessary to hold the thermocouple sensor cable into the shielding.

While the weld pads of the prior art are only in thermal contact with the surface of the structure, the mechanical connection of the shielding and the positioning pad of the present invention can provide a controlled means of additional thermal contact/heat transfer between the walls of the shielding (which are in thermal contact with the environment, e.g. with a process atmosphere, process fluid or flames inside a furnace, etc.) and the sensitive thermocouple sensor cable end, which is received and/or secured by the positioning pad at and in thermal contact with the surface of the structure. Thereby, absolute measurement accuracy of the thermocouple sensor can be improved significantly: The heat transfer through the mechanical connection between the shielding and the positioning pad can compensate for a temperature deviation at the part of the surface of the structure that is covered by the shielding, compared to the actual temperature of the surface, that would be measurable at the same location if that part of the surface was not covered by the shielding. In other words, the mechanical contact between the shielding and the positioning pad becomes a tailor-made thermal bridge.

A ratio between a height (i.e. material thickness) of the positioning pad and diameter of the thermocouple sensor cable can be chosen between 2:1 and 1:5, preferably between 1:1 and 1:4, particularly preferably between 1:2 and 1:3.5. As an example, for a sensor cable with a diameter of ¼ inch (6.4 mm), the material thickness of the positioning pad should particularly preferably be chosen between ⅛ inch (3.2 mm) and 1/14 inch (1.8 mm). The given ratios enable a controlled, effective transfer of heat between positioning pad and the closed thermocouple sensor cable end, while at the same time reduce weight of the assembly and amount of material required, resulting in reduced manufacturing cost and easier installation.

A ratio between a length of the section of the thermocouple sensor cable, which is in mechanical (and therefore also thermal) contact with the positioning pad, and the diameter of the thermocouple sensor cable can be at least 1:2, preferably at least 1:1, particularly preferably between 1.3:1 and 2:1. This length may also be described as a penetration depth of the sensor cable into the positioning pad. As an example, for a sensor cable with a diameter of ¼ inch (6.4 mm), the penetration depth should particularly preferably be chosen between 13/40 inch (8.3 mm) and ½ inch (12.8 mm). The given ratios enable a controlled, effective transfer of heat between positioning pad and the closed thermocouple sensor cable end and the positioning pad may receive and/or secure the sensor cable end very reliably and durably. At the same time, weight of the assembly and amount of material required are reduced, resulting in reduced manufacturing cost and easier installation.

The positioning pad can be mechanically connected to the shielding by welding or brazing of at least two pieces. The first piece would be the positioning pad, which may be a flat piece of steel or other suitable material. However, the pad could also have a curved or rounded shape to fit to a curved surface of a structure. The second piece would be the shielding in form of a box with an open bottom face and an opening in one of its walls, for example a side wall or a side face of the shielding, where the sheathed thermocouple sensor cable may enter the shielding. In case of a welded connection, the assembly of shielding and positioning pad might be achieved in a very durable manner. As the two parts are inseparably connected to each other, one may refer to this exemplary embodiment as an integral form of positioning pad and shielding. Alternative embodiments of such an integral form of shielding and positioning pad may be achieved by the use of adhesives or by press-fit stemming or by shaping from one piece or by additive shaping.

The mechanical connection between the positioning pad and the shielding may comprise at least one protrusion or protruding portion of the positioning pad, engaging with at least one corresponding recess or recessed portion at or through a wall of the shielding. The wall could be a side wall, a lid or any other wall of a housing, which is part of the shielding or forms the shielding. Protrusion and protruding portion are considered as synonyms throughout this document. Likewise, recess and recessed portion are also considered as synonyms. Here, the shielding having a recess 'through' a wall can mean that the recess actually is forming an opening between the inner free volume of the shielding and the outside of the shielding, for example at the bottom of a side wall of the shielding. For this design, the protruding portion of the positioning pad may be formed to fit in and through this opening, being flush with the external surface of the wall of the shielding. At the other hand, the shielding having a recess 'at' a wall, can means that the recess is arranged at an inner side of the wall and does not break through the wall. The first one of these possible designs has the advantage of a very easy, low-cost manufacturing of the recesses/openings; however, this also can mean that there may be small slits between the recesses and the protruding portions of the positioning pad at the outer surface of the walls of the shielding, which need to be sealed during the installation process. A possible method for this is described in the following paragraph. The second possible design does not need such sealing process, since there are no gaps, openings or slits in or through the walls of the shielding, except for the necessary opening, where the thermocouple sensor cable enters the shielding. This design might require a more complex manufacturing process of the shielding, however.

In both of these described examples (i.e. with at least one recess through a wall or at least one recess at a wall, respectively), the shielding and the positioning pad are initially two separate parts, as with a weld pad and shielding of state-of-the-art thermocouple assemblies. However, through the engagement of a protruding portion or portions of the positioning pad with a recessed portion or recessed portions of the shielding, both parts are rigidly connected or connectable and aligned in a defined position relative to each other. For example, after the parts are brought into engagement with each other and when the thermocouple assembly is placed on and secured to the surface of the structure, the engagement is formed such that the positioning pad, the shielding and the surface of the structure form a positive-fit connection, that will firmly hold the positioning pad in place, relative to the shielding. Alternatively, after the parts are brought into engagement with each other, the positioning pad and shielding are joined together, e.g. by welding, before the thermocouple assembly is placed on and secured to the surface of the structure.

In a possible advancement of this embodiment, the positioning pad comprises two protrusions at opposing sides of the pad, wherein the shielding comprises corresponding recesses on each of two opposing walls, e.g. on each of two opposing side walls. When both parts are brought into engagement and the thermocouple assembly is placed on the surface of the structure, for example welding is used to fix it to the surface. For example, the recesses form openings at the bottom of and through the side walls of the shielding and the protruding portions of the positioning pad fit in these openings, being flush with the external surface of the walls of the shielding, for example side walls. The size of the welding may be chosen big enough to not only fix the shielding to the surface, but also completely seal the recessed portions of the shielding, welding the protrusions of the positioning pad directly to the shielding. This method and construction enables a very simple design of all parts, while at the same time keeping the installation process uncomplicated with only one welding process and the resulting thermocouple assembly is very robust. While the method, to use the welding to secure the shielding to the surface and to sealingly cover possible slits or gaps at the recessed portion of the shielding at the same time, is described in the context of the embodiment with two recessed portions at opposing walls of the shielding, it might as well be applied to any design or embodiment with at least one recess through any wall of the shielding and at least one protruding portion of a positioning pad, engaging with that recess. In some examples, where the recess is not positioned directly at or close to the bottom side of the shielding, it might not be possible to seal slits or gaps of the recess with the same weld seam that connects the shielding to the structure. However, additional weld seams that would only cover the area of the recessed portion located anywhere on the shielding could still be applied during the same welding process and do not require additional inspections steps, as they do not affect the surface of the structure. Therefore, the positive effect of low installation cost and time-saving installation process are achievable with all aforementioned embodiments.

The shielding can comprise two corresponding recesses on each of two opposing walls, e.g. on each of two opposing side walls, that are not located at the bottom of that sidewalls. The positioning pad comprises two protruding portions, e.g. noses, each protruding from vertically extending members of the positioning pad and correspond to the recesses of the shielding. When the shielding is placed on top of the positioning pad and pressed down towards it, the protruding portions, e.g. noses, will clip into the recesses, thereby mechanically connecting the shielding and the positioning pad. This assembly would position the pad such that it would establish a robust contact with the tube surface. Furthermore, the inner sidewalls of the shielding may comprise guiding grooves that correspond to the vertically extending members to provide additional mechanical connection between shielding and positioning pad and prevent misalignment. In case the recesses are arranged 'through' the shielding, as described above, the protruding portions, e.g. noses, might be formed to fit in and through these recesses, and may be recessed or flush with the external surface of the sidewalls of the shielding. A welding can be used to sealingly close any openings or slits and/or rigidly connect both parts. In case the recesses are arranged 'at' the shielding, as described above, no welding is needed.

All the aforementioned different ways of construction and assembly may allow customizing the design to various applications and budgets.

In an exemplary embodiment of the thermocouple assembly, the mechanical connection and—if applicable, as defined above—the integral form of shielding and positioning pad may be achieved by essentially one connection section between the positioning pad and the shielding or by essentially two connection sections between the positioning pad and the shielding, arranged on opposing sides of the positioning pad, or by essentially two connection sections between the positioning pad and the shielding, arranged on adjacent sides of the positioning pad, or by essentially three connection sections between the positioning pad and the shielding, arranged on three adjacent sides of positioning pad.

Further, the positioning pad and the shielding can be connected over multiple connection sections distributed over at least one, two or three sides of the shielding's inner perimeter, e.g. on any side of the positioning pad there may be a series of connection sections or connections points. A connection section in the sense of this embodiment should be understood as a point or section of direct physical contact between a surface section or a part of the shielding and a surface section or a part of the positioning pad and/or an integral connection between these parts, e.g. a welded connection. In this embodiment the mechanical connection or integral form of shielding and positioning pad may be adapted to the requirement of a particular application. For example, a connection with only one connection section or with only a few connection points formed on one side of the positioning pad may be manufactured at low cost and will also provide the feature of a higher thermal insulation between the shielding's outer surface and the thermocouple sensor end at the measuring point inside the shielding. However, a higher number of connection sections, e.g. three connection sections arranged on three adjacent sides of positioning pad, may provide the benefits of a very durable and rigid construction and also provide a lower thermal insulation between the shielding's outer surface and the thermocouple sensor end at the measuring point inside the shielding, i.e. the higher number of connection sections work as thermal bridges, conducting more heat between the shielding and the thermocouple sensor end, positioned with the positioning pad. Measurement accuracy may be increased depending on the application under consideration, as the actual amount of heat transferred between shielding and thermocouple sensor end may be adapted to requirements of the application.

The positioning pad and/or the shielding can be integrally formed or at least mechanically connected with a guiding conduit and the thermocouple sensor cable is inserted or insertable into the guiding conduit. The guiding conduit may be connected with one end to the shielding, at the position of an opening in a wall of the shielding, for example a side wall or a side face of the shielding, where the thermocouple sensor cable enters the shielding and may be connected with its other end to the positioning pad at the means of the positioning pad for receiving and/or securing the thermocouple sensor end at the measuring point, e.g. at a slot of the positioning pad. In this particular embodiment the shielding, the positioning pad and the guiding conduit may be integrally formed as a one-piece design. The guiding conduit might be formed by a downward-open channel structure, like a half round tube, or might be formed by a conduit or tube, that is not open downwards and completely surrounds the thermocouple sensor cable.

The guiding conduit may comprise a receiving end portion to press the thermocouple sensor cable against the surface of the tube. Such receiving portion may be in the form of a dent or a tapered section. By pressing the thermocouple sensor cable end against the surface of the structure a better defined thermal contact is achieved and measuring accuracy, response time and repeatability are improved.

The thermocouple sensor cable can be integrally formed with the positioning pad and/or the shielding. For example, the sensor cable end might be welded or brazed to the positioning pad and/or to the shielding at an opening in a wall of the shielding, for example a side wall or a side face of the shielding, where the thermocouple sensor cable enters the shielding. This embodiment further simplifies the installation process. Because the sheathed thermocouple sensor cable is fixedly connected to the other parts of the thermocouple assembly, the sensor cable end is effectively prevented from dislocation during the installation process. Therefore, measurement repeatability and accuracy are improved. Also, this embodiment provides high durability and high stability.

The thermocouple sensor cable can be detachably connected with the positioning pad. In this embodiment the securing of the shielding to the structure is further simplified, as the lengthy sensor cable can be separated from the shielding. After successful installation of the shielding on the structure, the sensor cable may simply be pushed or slid into the shielding through an opening in a wall of the shielding, for example a side wall or a side face of the shielding, until it mates or engages with the positioning pad, i.e. a slot in the positioning pad, where the thermocouple sensor cable end is received and/or secured. Furthermore, the sensor cable may easily be extracted from the shielding without the need to remove the whole assembly. Thus, the thermocouple sensor cable may be exchanged to a new one, in case of a damage or necessary recalibration.

The thermocouple sensor cable can comprises a lock that engages with a corresponding holder of the shielding when the thermocouple sensor cable is inserted into the shielding and the thermocouple sensor end meets with a receiver of the positioning pad, wherein the thermocouple sensor cable is mechanically blocked from being extracted from the shielding. The lock may be in the form of a ring, a ring segment or any other protrusion on the surface of the sheath of the thermocouple cable, or a taper of the sheath.

In an example, the lock does not protrude from a bottom side of the thermocouple sensor cable, so that the sensor cable may be placed flat directly on the surface of a structure to be measured. In the simplest form the holder may just be the edge of the opening in a wall of the shielding, for example a side wall or a side face of the shielding, where the thermocouple sensor cable enters the shielding. With this design manufacturing costs can be significantly reduced: a shielding with a holder may be used for both applications/designs where the thermocouple sensor cable is either required to be extractable or is required to be non-extractable from the shielding, once the shielding is fixed to the surface of a structure. The decision on extractability does only impact the thermocouple sensor cable, which either comprises a lock or not. Hence, only one shielding design is needed for both versions, manufacturing and storage costs can be reduced. Also, when the whole thermocouple assembly is removed from the structure, the sensor cable may be easily removed from the shielding. Thus, costs for dismantling and disposal, compared to embodiments where a sheathed thermocouple sensor cable may be integrally formed with the shielding and/or positioning pad, can be reduced.

The shielding and/or the positioning pad and/or at least a portion of the thermocouple sensor cable, which is covered by the shielding, can be formed to match the surface of the structure, to which the thermocouple assembly is installed, e.g. formed either curved to match the surface of a pipe or formed straight to match the surface of a flat structure. By matching the form of the bottom of the thermocouple assembly to the form of the surface, to which the thermocouple assembly is to be installed, several benefits can be achieved: The thermocouple assembly can be installed with minimum space requirements and the connection to the surface, e.g. by welding, can be achieved easily and without any gaps or slits, therefore being very robust and reliable. In exemplary embodiments, where also the positioning pad's bottom surface matches the form of the surface of the structure, i.e. the positioning is in areal contact with the surface, the thermal contact to the structure is improved. Thereby the contribution of heat transfer from or to the surface of the structure or pipe is increased, which may reduce response time and improve absolute measurement accuracy of the thermocouple sensor in some applications. At the other hand, a shielding with a curved bottom side may be combined with a flat positioning pad to reduce the thermal contact between positioning pad and the surface of the structure or pipe, thereby providing a defined point or line of contact right at the desired measurement point, decreasing the contribution of heat transfer from and to the surface of the structure or pipe through the positioning pad, which may increase absolute measurement accuracy in other applications.

This is applicable to installations, where the thermocouple sensor cable inside the shielding may be oriented perpendicular to the cylinder axis of a pipe or tube structure, i.e. the thermocouple assembly partly winds around the tube or pipe. Thus, the shielding and positioning pad are curved about an axis perpendicular to the direction of extension of the thermocouple sensor cable. This installation is particularly suitable to structures with bigger tube diameters and/or more space in between pipes. However, this embodiment is also applicable to installations, where the thermocouple sensor cable inside the shielding is oriented in parallel to the cylinder axis of a pipe or tube structure, what may be referred to as an in-line installation of the thermocouple assembly. In such cases the shielding or at least the bottom side of the shielding and the positioning pad are curved about an axis parallel to the direction of extension of the thermocouple sensor cable. This installation is particularly suitable to structures with small tube diameters and/or less space in between pipes. With a suitable curvature of the parts of the thermocouple sensor assembly the aforementioned benefits of this embodiment can be achieved in different kinds of installation orientations.

Another aspect of the invention relates to a method for installation of a thermocouple assembly. The thermocouple assembly comprises a sheathed thermocouple sensor cable, a positioning pad, an insulation body and a shielding. The method comprises the steps of mechanically connecting the positioning pad to the shielding and securing, at a desired position on a surface of a structure, the shielding to the surface.

The surface of the structure around the desired position may be cleaned and/or prepared beforehand. The securing of the shielding to the surface may be achieved by welding, brazing, screwing, clamping or any other suitable means of connecting.

Subsequently, in case that the thermocouple sensor cable is not integrally formed with the other parts of the assembly and therefore not already in place with the shielding, the thermocouple sensor cable may be inserted into the shielding until it reaches the positioning pad and the thermocouple sensor cable end meets the desired measuring point, defined by a receiver of the positioning pad.

Mechanically connecting the positioning pad to the shielding can mean that these parts are integrally formed or rigidly connected to each other, before they are placed on the surface of the structure, to which the shielding will be secured in the following step.

However, if the positioning pad comprises at least one protruding portion and the shielding comprises at least one recessed portion that corresponds to the protruding portion of the positioning pad, the step of mechanically connecting the positioning pad to the shielding comprises the further steps of placing the positioning pad at the desired position on the surface of the structure, placing the shielding on the positioning pad, such that the at least one protruding portion of the positioning pad mates and/or engages with the at least one corresponding recessed portion of the shielding, thereby forming a mechanical connection, and then securing the shielding to the surface.

Another aspect of the invention relates to another method for installation of a thermocouple assembly, comprising a sheathed thermocouple sensor cable, a positioning pad, an insulation body and a shielding, wherein the positioning pad is mechanically connected to and/or integrally formed with the shielding, wherein the thermocouple sensor cable comprise a lock that engages with a corresponding holder of the shielding. The method comprises the steps of inserting the thermocouple sensor cable into the shielding, securing the thermocouple sensor end with the positioning pad, engaging the lock with the holder, placing the thermocouple assembly on a desired position on a surface of a structure and securing the shielding to the surface.

The shielding can be secured to the surface by welding, and the shielding and the positioning pad may be permanently joined together by this same welding process and/or the recessed portion of the shielding is covered and sealed by the welding. This embodiment has the advantage of a very robust and reliable installation, while at the same time the design of the parts is simple and the installation process is easy and cost-efficient.

All aforementioned methods for the installation of a thermocouple assembly share the advantage, that at least the shielding and the positioning pad may be installed and secured to the surface of the structure in one single step, because by securing the shielding to the structure, the positioning pad may also be secured, as it is mechanically connected to and/or integrally formed with the shielding. Especially in the case, where the thermocouple assembly is secured to the surface of the structure by welding, this means a significant saving in time and cost, since only one welding process is required with only one following inspection of the welded area, as well as only one cycle of pre-heating for the welding process, and following cooling after the welding process, if such pre-heating and cooling is required.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
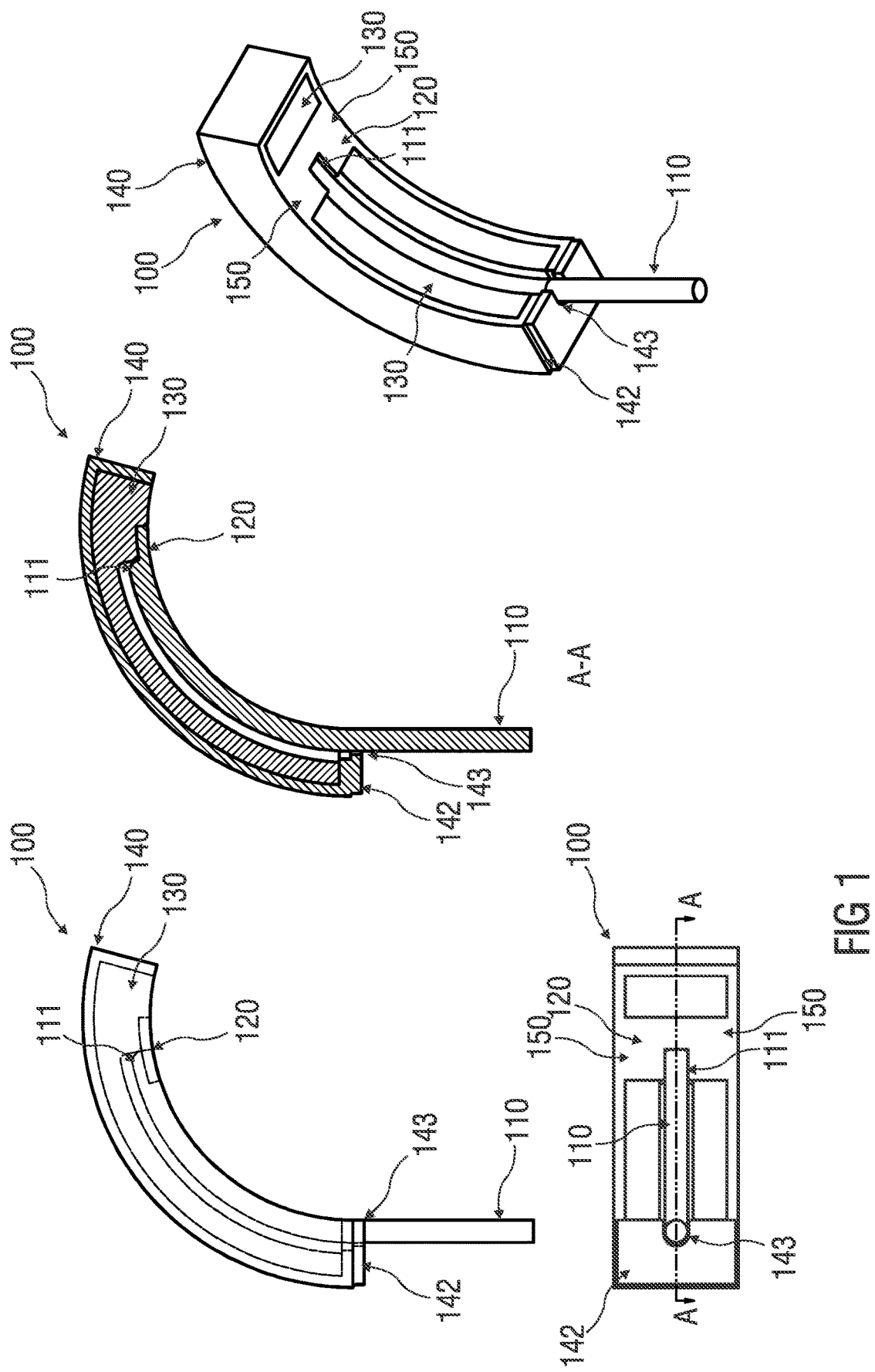
FIG. 1 schematically shows an exemplary embodiment of a thermocouple assembly.

FIG. 1 shows an exemplary embodiment of a thermocouple assembly 100 in a perspective view as well as in three side views/sectional views.

The thermocouple assembly 100 comprises a sheathed thermocouple sensor cable 110, a positioning pad 120 for receiving and/or securing a thermocouple sensor end 111 at a desired measuring point on or close to a surface of a structure, and a shielding 140.

The shielding covers the positioning pad 120 and at least a part of the sheathed thermocouple sensor cable 110 and an insulation body 130, filling the inner free volume of the shielding 140, wherein the positioning pad 120 is integrally formed with the shielding 140.

In this exemplary embodiment the positioning pad 120 is in the form of a bridge, extending between two opposing inner side walls of the shielding 140; the connection between shielding 140 and positioning pad 120 is formed by two connection sections 150, opposing each other. The thermocouple sensor cable 110 enters the shielding through an opening 143 of a side face 142 of the shielding 140.

Figure 2:
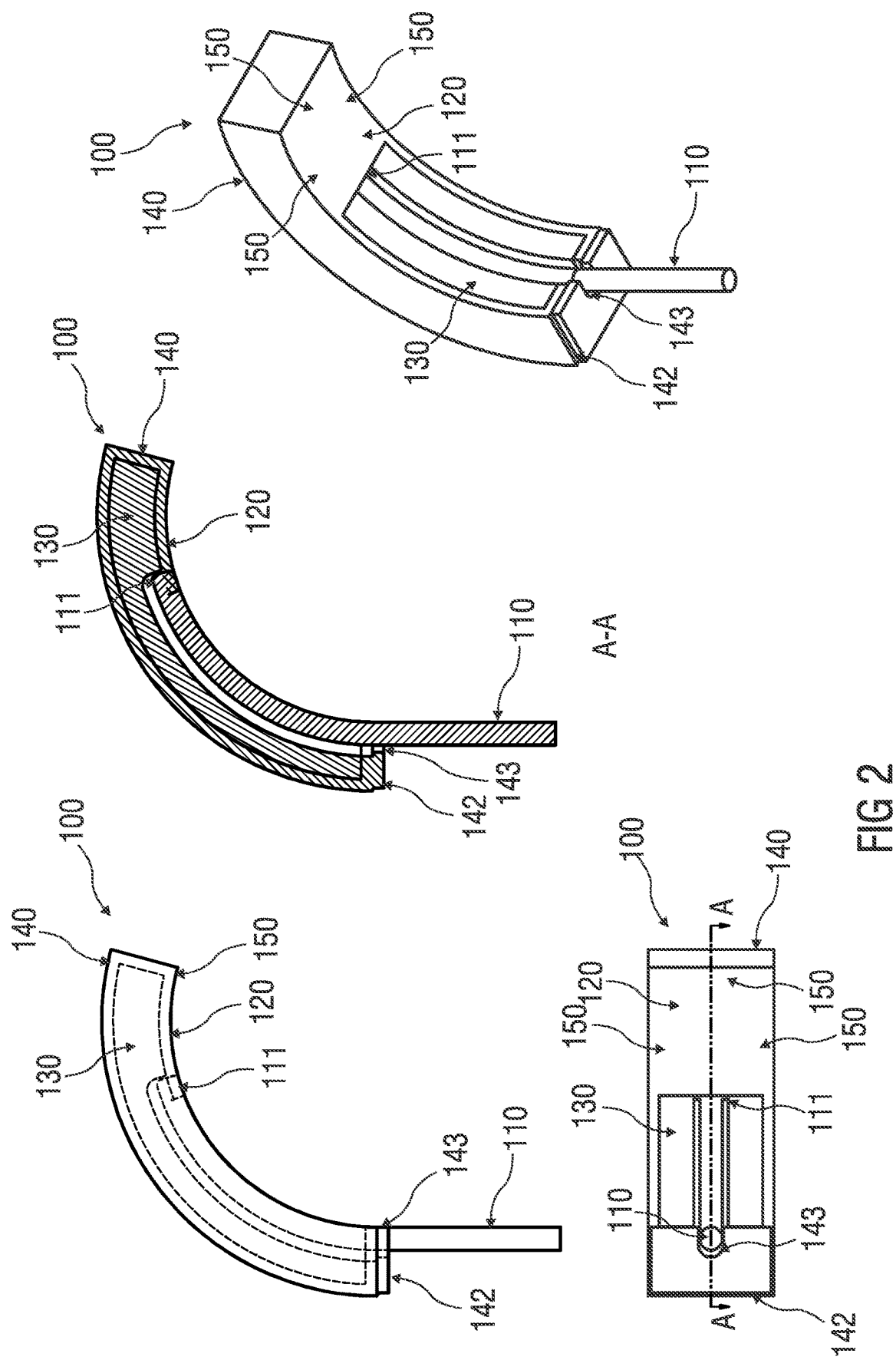
FIG. 2 schematically shows an exemplary embodiment of a thermocouple assembly.

FIG. 2 shows another exemplary embodiment of a thermocouple assembly 100 in a perspective view as well as in three side views/sectional views.

In contrast to FIG. 1, the positioning pad 120 of FIG. 2 is connected to the shielding 140 through three connection sections 150, arranged on three adjacent sides of the positioning pad 120. Hence, the positioning pad 120 covers part of the otherwise open bottom face of the box-like shielding 140.

Figure 3:
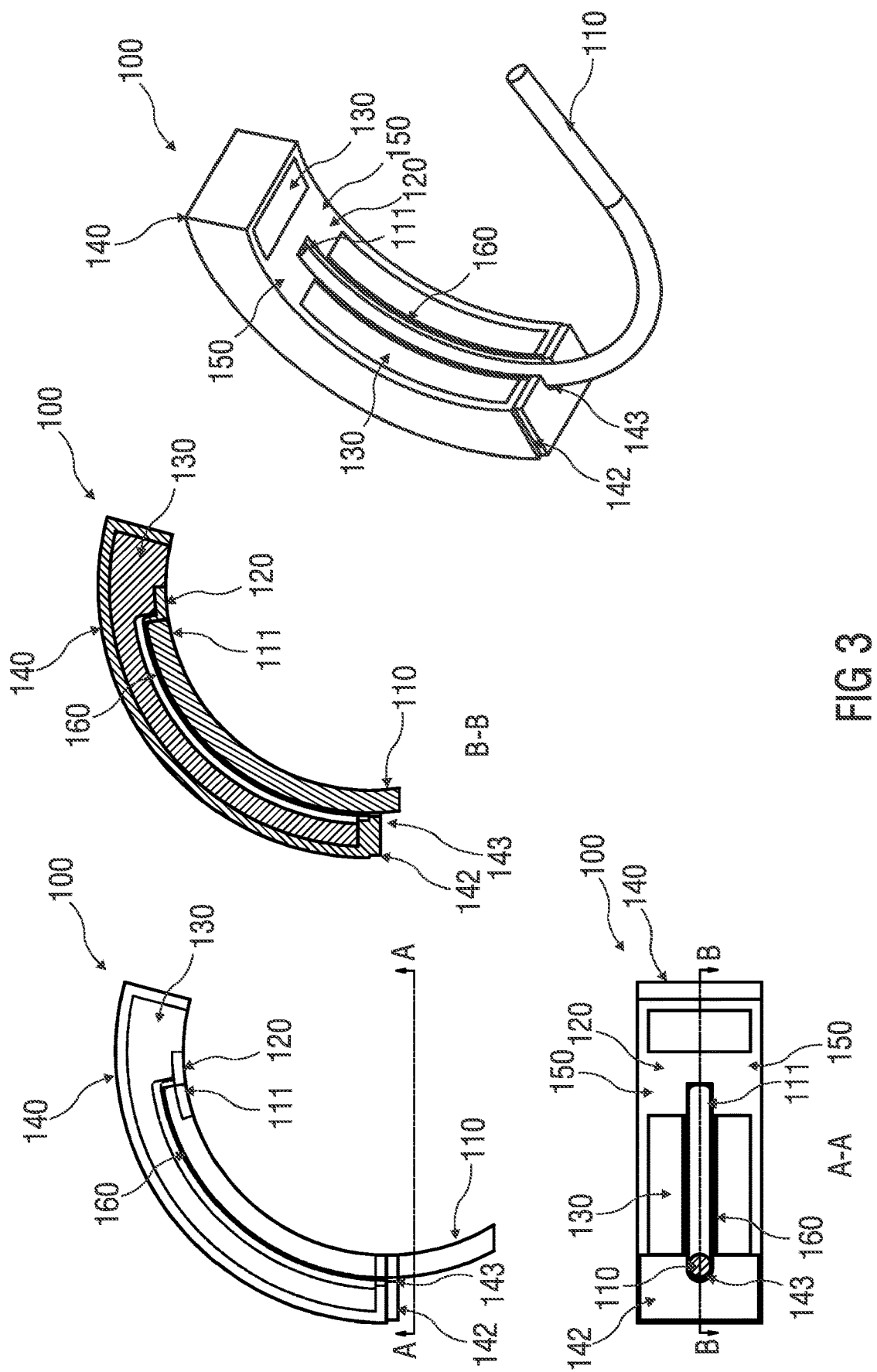
FIG. 3 schematically shows an exemplary embodiment of a thermocouple assembly.

FIG. 3 shows another exemplary embodiment of a thermocouple assembly 100 in a perspective view as well as in three side views/sectional views.

While the connection between positioning pad 120 and shielding 140 is similar to that shown in FIG. 1 ("bridge-type"), the thermocouple assembly 100 in FIG. 3 additionally comprises a guiding conduit 160, which is connected with one end to the shielding 140 at the position of an opening 143, where the thermocouple sensor cable 110 enters the shielding 140. Further, the guiding conduit 160 is connected with its other end to the positioning pad 120 at the means of the positioning pad 120 for receiving and/or securing the thermocouple sensor end 111. While the guiding conduit 160 is shown as a downward-open channel in this embodiment, a closed conduit, like a tube, may also be used without leaving the scope of the invention.

Figure 4:
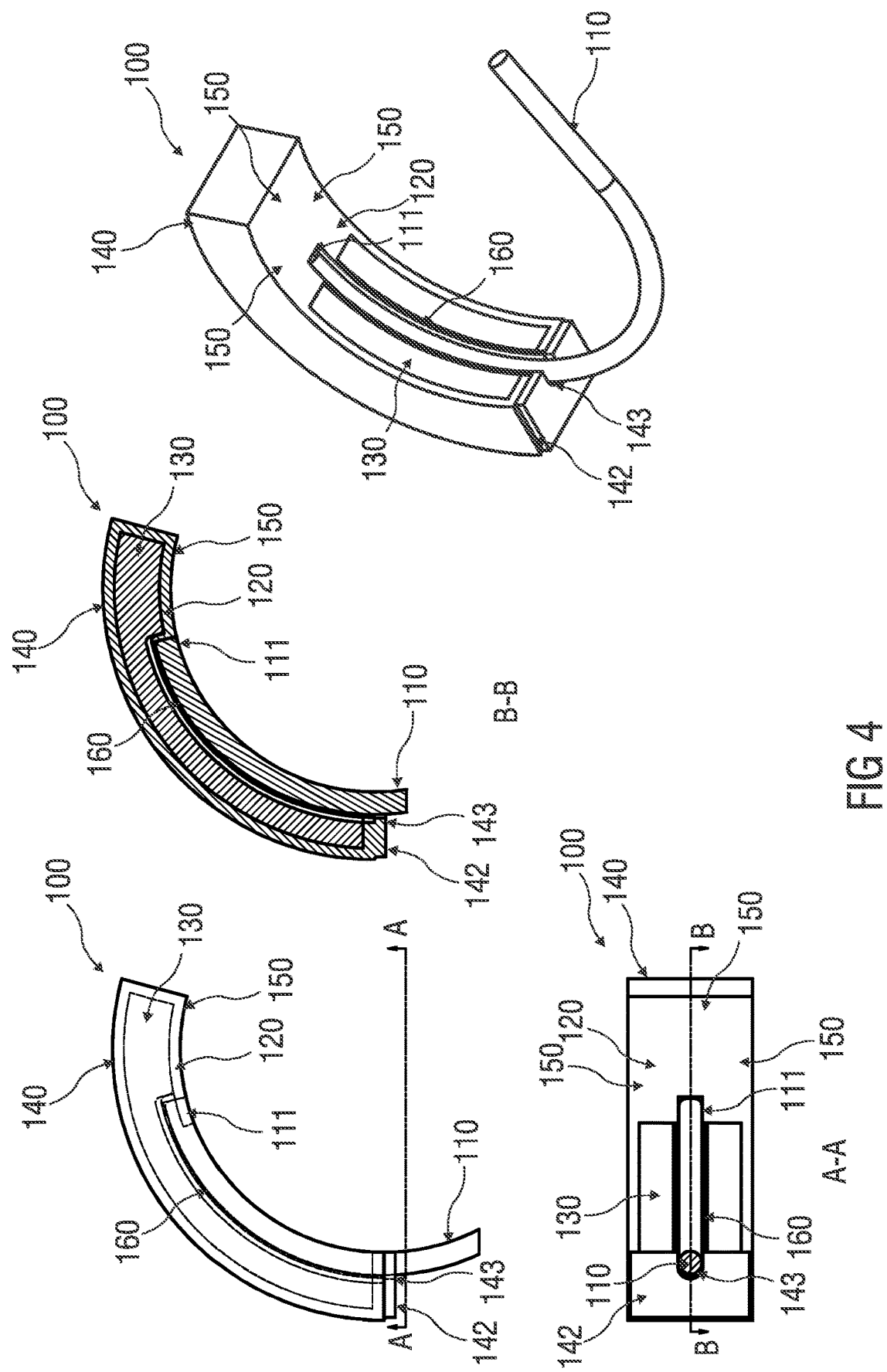
FIG. 4 schematically shows an exemplary embodiment of a thermocouple assembly.

FIG. 4 shows another exemplary embodiment of a thermocouple assembly 100 in a perspective view as well as in three side views/sectional views.

While the connection between positioning pad 120 and shielding 140 is similar to that shown in FIG. 2, the assembly in FIG. 4 additionally comprises a guiding conduit 160, which is connected with one end to the shielding 140 at the position of an opening 143, where the thermocouple sensor cable 110 enters the shielding 140. Further, the guiding conduit 160 is connected with its other end to the positioning pad 120 at the means of the positioning pad 120 for receiving and/or securing the thermocouple sensor end 111.

Figure 5:
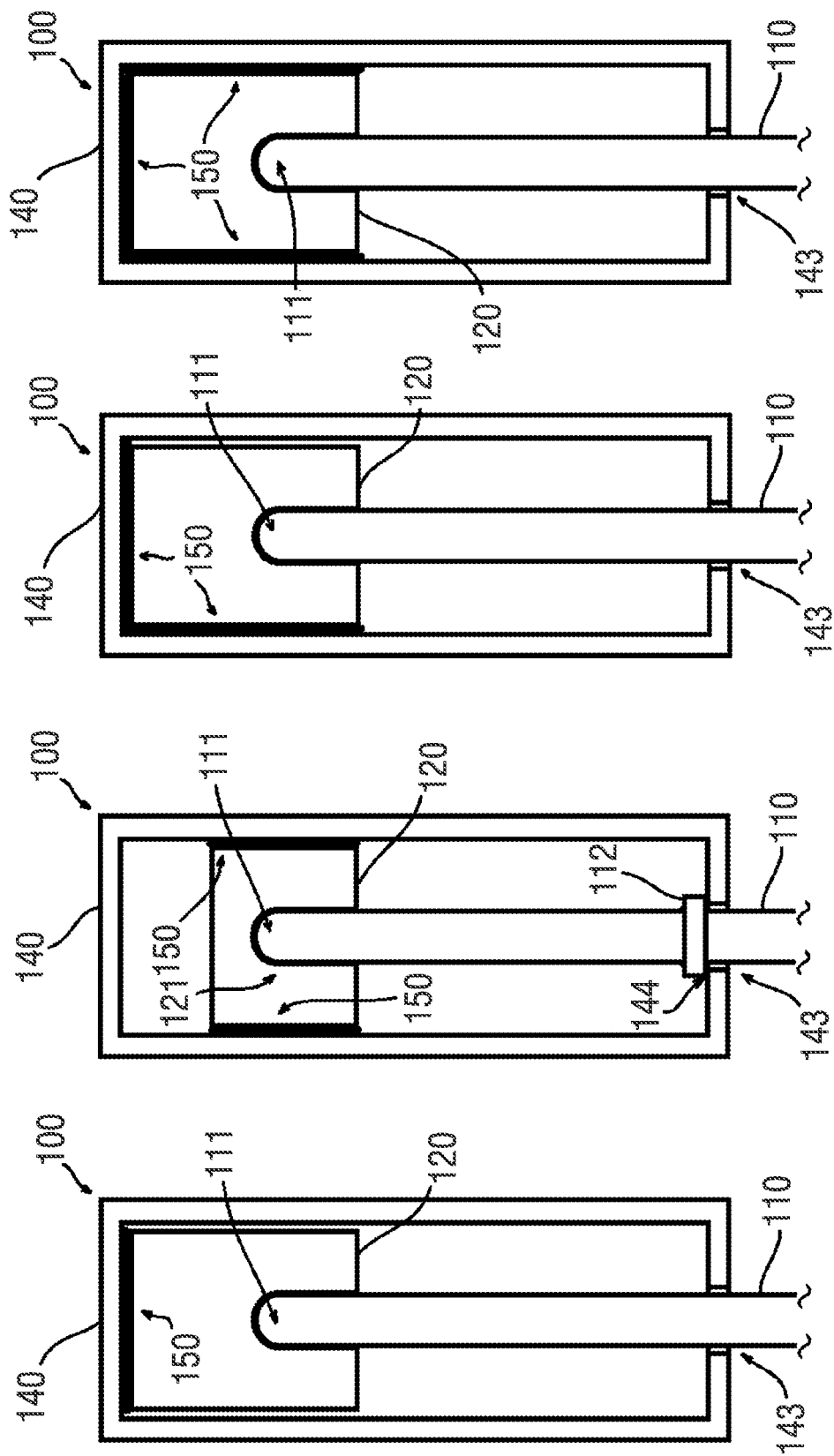
FIG. 5.1-5.4 schematically show exemplary embodiments of a thermocouple assembly, FIG. 6.1-6.3 schematically show exemplary embodiments of a thermocouple assembly, FIG. 7 schematically shows an exemplary embodiment of a thermocouple assembly, FIGS. 8.1 and 8.2 schematically show exemplary embodiments of a shielding with recessed portions, FIGS. 8.3 and 8.4 schematically show exemplary embodiments of a positioning pad with protruding portions, FIG. 9.1-9.3 schematically show steps of an exemplary method for installation of a thermocouple assembly, FIG. 10.1-10.4 schematically show exemplary embodiments of a thermocouple assembly, FIG. 11 schematically shows an exemplary embodiment of a thermocouple assembly, and FIG. 12.1-12.3 schematically show an exemplary embodiment of a thermocouple assembly.

FIG. 5.1-5.4 show exemplary embodiments of a thermocouple assembly 100 in a side view of the bottom side. The embodiments each comprise a sheathed thermocouple sensor cable 110 and a positioning pad 120 for receiving and/or securing the thermocouple sensor end 111 at a desired measuring point on or close to a surface of a structure. Further, the embodiments comprise a shielding 140, covering the positioning pad 120 and at least a part of the sheathed thermocouple sensor cable 110, and an insulation body, filling the inner free volume of the shielding 140, wherein the positioning pad 120 is mechanically connected to and/or integrally formed with the shielding 140.

In FIG. 5.1 the positioning pad 120 is connected to the shielding 140 through one connection section 150. While the connection section 150 in this embodiment is arranged on an upper side on the positioning pad 120, it may as well be arranged on a left, right or lower side of the positioning pad 120, without leaving the scope of this invention. While the connection section 150 is shown in this embodiment as one continuous connection, e.g. a continuous weld along the full width of the side of the positioning pad 120, a shorter connection section 150 that does not cover the full width of the side of the positioning pad 120, a series of shorter connection sections 150 or a series of connections points may as well be used, without leaving the scope of the invention.

In FIG. 5.2 the positioning pad 120 is connected to the shielding 140 through two connection sections 150, arranged on opposing sides of the positioning pad 120. This arrangement may be referred to as a "bridge-type" positioning pad 120. While the connection sections 150 are shown in this embodiment as continuous connections, e.g. continuous welds along the full width of each side of the positioning pad 120, shorter connection sections 150 that do not cover the full width of each side of the positioning pad 120, a series of shorter connection sections 150 or a series of connections points may as well be used, without leaving the scope of the invention.

Furthermore, this embodiment additionally comprises a lock 112 in form of a ring, a ring segment or other protrusion, that is attached to the sheath of the thermocouple sensor cable 110. The shielding comprises a holder 144, which is formed by the inner wall of the shielding 140 surrounding the opening 143 of the shielding, where the thermocouple sensor cable 110 enters. The lock 112 abuts the holder 144, therefore the sensor cable 110 cannot be extracted from the shielding 140, once the shielding 140 is fixed to the surface of a structure. The assembly of this embodiment may comprise the steps of inserting the thermocouple sensor cable end 111 into a slot 121 of the positioning pad 120 under an angle and pivoting the sensor cable 110 about the sensor cable end 111, which is secured in or with the positioning pad 120, until the thermocouple sensor cable 110 fits into the opening 143 and lock 112 engages the holder 144.

In FIG. 5.3 the positioning pad 120 is connected to the shielding 140 through two connection sections 150, arranged on adjacent sides of the positioning pad 120. This arrangement may be referred to as a "corner-type" positioning pad 120. While the connection sections 150 are shown in this embodiment as continuous connections, e.g. continuous welds along the full width of each side of the positioning pad 120, shorter connection sections 150 that do not cover the full width of each side of the positioning pad 120, a series of shorter connection sections 150 or a series of connections points may as well be used, without leaving the scope of the invention.

In FIG. 5.4 the positioning pad 120 is connected to the shielding 140 through three connection sections 150, arranged on adjacent sides of the positioning pad 120. While the connection sections 150 are shown in this embodiment as continuous connections, e.g. continuous welds along the full width of each side of the positioning pad 120, shorter connection sections 150 that do not cover the full width of each side of the positioning pad 120, a series of shorter connection sections 150 or a series of connections points may as well be used, without leaving the scope of the invention.

Figure 6:
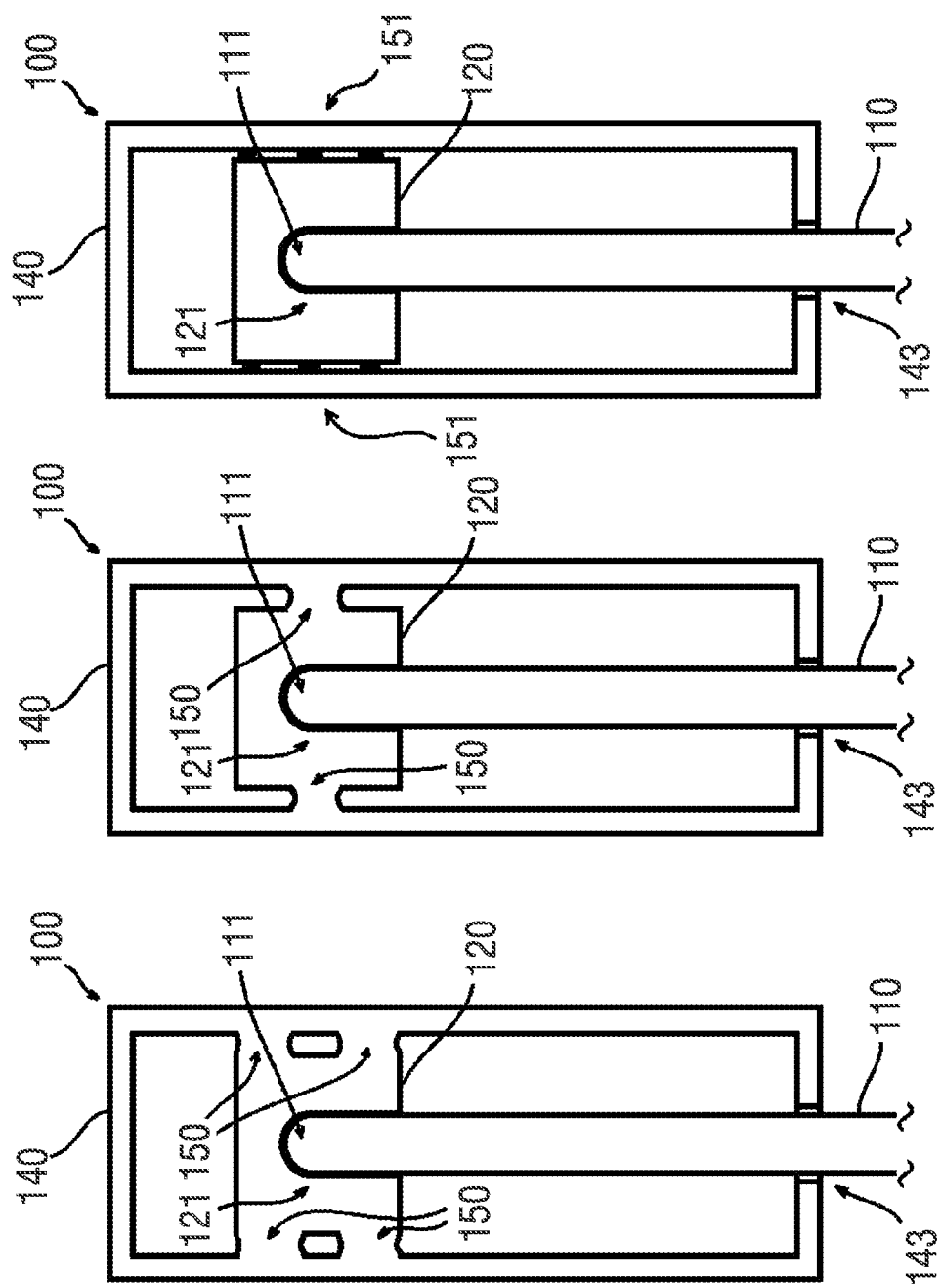

FIG. 6.1-6.3 show exemplary embodiments of a thermocouple assembly 100 in a side view of the bottom side. The embodiments each comprise a sheathed thermocouple sensor cable 110 and a positioning pad 120 for receiving and/or securing the thermocouple sensor end 111 at a desired measuring point on or close to a surface of a structure. Further, the embodiments each comprise a shielding 140, covering the positioning pad 120 and at least a part of the sheathed thermocouple sensor cable 110, and an insulation body, filling the inner free volume of the shielding 140. The positioning pad 120 is mechanically connected and/or integrally formed with the shielding 140.

In FIG. 6.1 the positioning pad 120 is connected to the shielding 140 in another "bridge-type" arrangement. In contrast to FIG. 5.2, however, the connection comprises two separate connection sections 150 on both opposing sides of the positioning pad 120. Between the two connection sections 150 on each side of the positioning pad 120 there is a non-connected void section. While these connection section 150 are shown in this embodiment as continuous connections, e.g. continuous welds, a series of shorter connection sections 150 or a series of connections points may as well be used, without leaving the scope of the invention.

In FIG. 6.2 the positioning pad 120 is connected to the shielding 140 in another "bridge-type" arrangement. In contrast to FIG. 5.2, however, the connection sections 150 do not extend over the full side length of the positioning pad, but are recessed on both sides.

In FIG. 6.2 the positioning pad 120 is connected to the shielding 140 in another "bridge-type" arrangement. In contrast to FIG. 5.2, however, the connection comprises a series of connection points 151 on both sides of the positioning pad 120 instead of continuous connection sections 150.

FIGS. 1-4 show exemplary embodiments of a thermocouple assembly 100 which have a rounded/curved shape to fit the surface of a tube or pipe structure.

Figure 7:
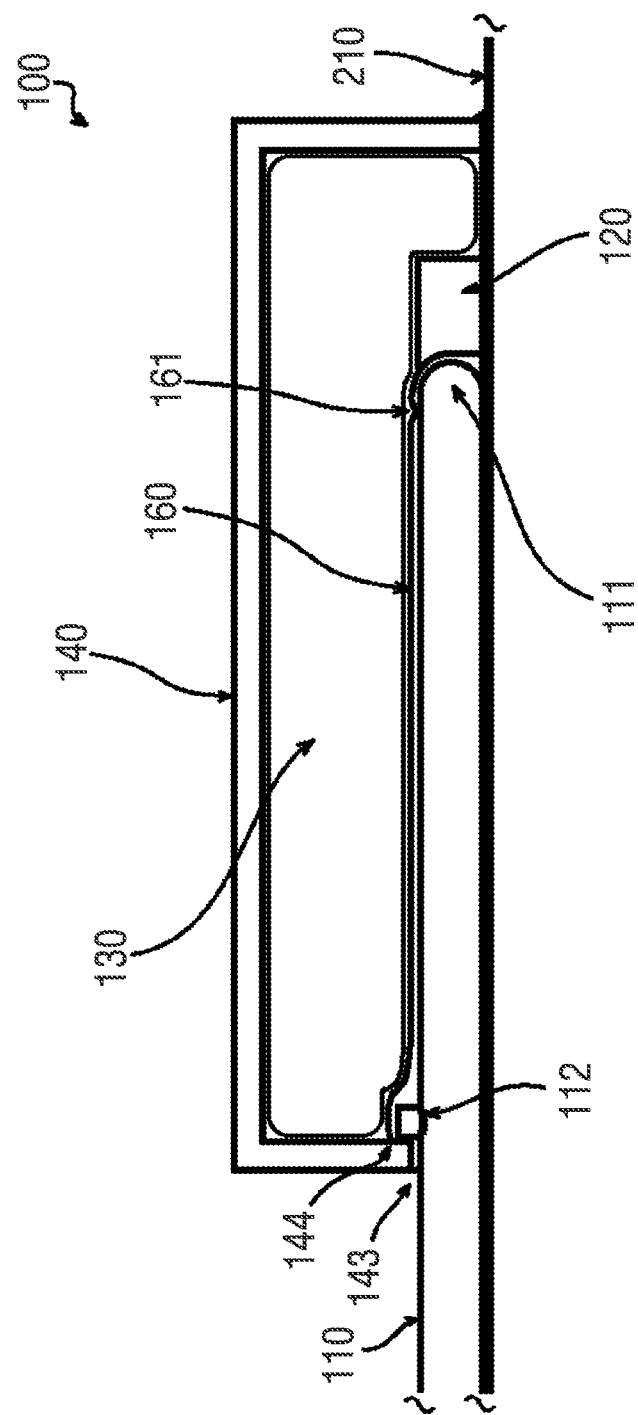

FIG. 7 however, displays an embodiment of a thermocouple assembly 100 that has a straight form, to match a flat surface 210 of a structure. The thermocouple assembly 100 of this embodiment comprises a guiding conduit 160 in the form of a channel that is open downwards. A receiving end portion 161 of the guiding conduit 160 presses the thermocouple sensor cable end 111 against the surface 210 of the structure at the measuring point.

The sheathed thermocouple sensor cable 110 comprises a protrusion on an upper side as a lock 112, which is positioned along the length of the sensor cable 110 to abut against a holder 144 of the shielding 140, when the sensor cable end 111 meets with a receiver of the positioning pad 120 at the measuring point.

The holder 144 is formed by the inner wall of the shielding 140, that surrounds the opening 143, where the sheathed thermocouple sensor cable 110 enters the shielding 110.

The guiding conduit 160 is flared in proximity of this opening 143 to leave room for the lock 112. The features shown in this figure are also applicable to the embodiments shown in other figures, where the thermocouple assembly parts are formed curved to match a non-straight surface of a structure, like a pipe.

FIGS. 8.1 and 8.2 show an exemplary embodiment of a shielding 140 with two recessed portions 145, one on each of its two side faces 142, and an opening 143, where a thermocouple sensor cable 110 can be inserted into the shielding 140. The recessed portions 145 are formed 'through' the walls of the shielding, thereby forming openings between the inner free volume of the shielding and the outside.

FIG. 8.1 shows a bottom view of such shielding, whereas FIG. 8.2 shows a side view.

FIGS. 8.3 and 8.4 show an exemplary embodiment of a positioning pad 120 with two protruding portions 122 on opposing sides with a thermocouple sensor cable 110 attached to the positioning pad 120.

Two dotted lines cross the FIGS. 8.1-8.4 to indicate, that the recessed portions 145 of the shielding and the protrusions 122 of the positioning pad 120 match in size, such that they might be referred to as corresponding to each other. Not only the width of the protrusions 122 fits the width of the recessed portions 145. The height is also matched and the length of the protruding portions 122 is matched to the thickness of the wall of the shielding 140, such that the protruding portions 122 end flush with the outer surface of the shielding 140, when the shielding 140 of FIGS. 8.1, 8.2 is placed on the positioning pad 120 of FIGS. 8.3, 8.4. The parts in these figures are formed curved to match the curved surface of pipe structure. However, the shown design might as well be applied to straight parts that match a flat surface.

FIGS. 9.1-9.3 show exemplary steps of a method to install a thermocouple assembly 100 on a structure 200 for surface temperature measurements. The shown structure 200 is a pipe.

In a first step, shown in FIG. 9.1, a thermocouple sensor cable 110 with a connected positioning pad 120 is placed on a desired measuring point on the surface of the structure 200. Beforehand, a surface area 211 might be cleaned or grinded to provide good conditions for a later welding. The positioning pad 120 comprises two protruding portions 122.

In a second step, shown in FIG. 9.2, a shielding 140, comprising recessed portions 145 that correspond to the protruding portions 122 of the positioning pad 120, is placed on the positioning pad 120 and the surface of the structure 200, such that the recessed portions 145 and protruding portions 122 mate and/or engage with each other.

In a third and final step, as shown in FIG. 9.3, the shielding 140 is secured to the surface of the structure 200 by a welding 300. Dimensions and parameters of the welding 300 might be chosen such that the recessed portions 145 are completely covered and sealed by the welding 300. Also, in an exemplary embodiment, the protruding portions 122 of the positioning pad 120 might be permanently connected to the shielding 140 by the welding 300 at the same time.

FIG. 10.1 shows another exemplary embodiment of a thermocouple assembly 100, that is installed in-line with a pipe structure 200 on the surface 210 of the pipe.

The thermocouple sensor cable 110 therefore is oriented in a straight manner. A shielding 140 is secured to the structure by welding 300 to provide protection for the thermocouple sensor cable end 111. A positioning pad 120 is mechanically connected to the shielding 140 and receives and holds the thermocouple sensor cable end 111 at a desired measuring point. In contrast to the exemplary embodiments of FIGS. 1, 2, 3, 4, 8.1-8.3 and 9.1-9.3, where, respectively, shielding 140, positioning pad 120 and a part of thermocouple sensor cable 110 are shown curved around an axis perpendicular to the direction of extension of the thermocouple sensor cable, to be fitted around a pipe or tube structure, the assembly of FIG. 10.1 comprises a shielding 140 and thermocouple sensor cable 110 with a straight form, parallel to the structure. However, the bottom side of the shielding 140 as well as the positioning pad 120 are curved about an axis parallel to the direction of extension of the thermocouple sensor cable 110 to still fit perfectly to the curved surface 210 of the structure 200. This is further illustrated in FIGS. 10.2 and 10.3.

FIG. 10.2 shows a sectional view of the thermocouple assembly 100 of FIG. 10.1 through sectional plane A as indicated in FIG. 10.1 for an embodiment where the mechanical connection between shielding 140 and positioning pad 120 comprises two protruding portions 122 of the positioning pad 120, mating with two corresponding recessed portions 145 of the shielding. The welding 300, which secures the shielding to the surface 210 of the structure 200, completely covers the recessed portions 145, thereby sealingly and rigidly connecting the shielding 140, the positioning pad 120 and the surface 210.

FIG. 10.3 also shows a sectional view of the thermocouple assembly 100 of FIG. 10.1 through sectional plane A as indicated in FIG. 10.1, but for an embodiment where the mechanical connection between shielding 140 and positioning pad 120 comprises an integral form of both parts, i.e. the positioning pad 120 is integrally formed with/connected to the shielding 140 by welding 300', before the shielding itself is secured to the structure by welding 300.

FIG. 10.4 also shows a sectional view of a thermocouple assembly 100 installed in-line on a tube structure 200, similar to the assembly of FIG. 10.1. The bottom side of the shielding 140 is curved to match the surface of the tube. However, in this embodiment, the positioning pad 120 is not curved to fit the surface of the structure, but is flat instead. Thereby, a defined thermal and mechanical contact point or line between the positioning pad 120 and the surface is formed at or through a desired measuring point 220. The thermocouple sensor cable end 111 is positioned and held at exact this point.

FIG. 11 shows another example for a thermocouple assembly 100, comprising a shielding 140 and a thermocouple sensor cable 110, which are formed curved to be arranged around a tube 200 and match the surface of the tube structure 200, combined with a positioning pad 120 that is not curved. The flat positioning pad 120 receives and holds the thermocouple sensor cable end 111 at a desired measuring point 220. Because of the flat form of the positioning pad 120, the mechanical and thermal contact between it and the surface of the structure 200 is reduced to only a narrow line going through the measuring point 220, perpendicular to the orientation of extension of the thermocouple sensor cable 110. Thereby the influence of the heat transfer through the positioning pad 120 between the walls of the shielding 140 and the sensitive tip of the thermocouple sensor cable end 111, compared to the heat transfer through the positioning pad 120 between the area of the surface of the structure 200 surrounding the measuring point 220 and the sensitive tip of thermocouple sensor cable end 111, is increased. Consequently, this heat transfer may even compensate for large deviations in surface temperature under the shielding 140.

FIG. 12.1 shows another example for a thermocouple assembly 100 in a sectional view, similar to the sectional views of FIGS. 10.2 to 10.4; however, in this example, the thermocouple assembly 100 is arranged on the surface of a flat structure. The shielding 140 comprises two recessed portions 145 arranged at the inner surface of opposing side walls. These recesses 145 are formed to engage with protruding portions 122 of a positioning pad 120. However, in contrast to the configurations of recesses and protrusions of other exemplary embodiments, e.g., as shown in the FIGS. 8.1-8.4, 9.1-9.3 and 10.2, the recesses 145 of the shielding 140 are not positioned at the bottom of the respective side walls. For the protruding portions 122 of the positioning pad 120 to engage with these recesses 145 while at least a portion of the positioning pad 120 stays in firm contact with the surface 210 of the structure 200, the positioning pad 120 comprises vertically extending members 123, which provide the protrusions 122, e.g. in the shape of noses, at the required position, i.e. at the required height. The part of the positioning pad 120, which is in contact with the surface 210, receives and/or secures the closed thermocouple sensor cable end 111 at a desired measuring point.

FIG. 12.2 shows the shielding 140 and positioning pad 120 of FIG. 12.1 in a sectional view, before engagement of the parts. To achieve the mechanical connection between positioning pad 120 and shielding 140, i.e. to achieve engagement of the protruding portions 122 with the recessed portions 145, the shielding 140 may be placed on top of the positioning pad 120 and pushed downwards. The vertically extending members 123 are designed flexible, such that they can bend inwards to allow the protrusions 122 so slide up to meet and engage with, i.e. snap or clip into the recessed portions 145. To provide additional guidance during engagement of both parts, to provide additional stability and to prevent any misalignment or slipping of the positioning pad 120, the inner side walls of the shielding 140 comprise guiding grooves 146, that receive and guide the vertically extending members 123.

FIG. 12.3 shows the shielding 140 of FIG. 12.2 in a sectional view through sectional plane B, as indicated in FIG. 12.2. Here, guiding grooves 146 and recessed portions 145 are further displayed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A structure comprising:
a thermocouple assembly for surface temperature measurement on a surface of the structure, the thermocouple assembly comprising:
a sheathed thermocouple sensor cable;
a positioning pad to receive and/or secure a thermocouple sensor end of the thermocouple sensor cable at a desired measuring point;
a shielding that covers a portion of each of the thermocouple sensor cable and the positioning pad; and
an insulation body provided inside of the shielding,
wherein the positioning pad is mechanically connected to the shielding,
wherein a continuous weld along a full length of at least one side of the shielding is provided where the shielding is welded to the surface of the structure,
wherein the shielding has at least one recessed portion and the positioning pad has at least one protruding portion that is received within the at least one recessed portion, and
wherein the weld covers and seals the at least one recessed portion and the at least one protruding portion that is received therein.

2. The structure of claim 1, wherein a mechanical connection provides for the connection between the positioning pad and the shielding, the mechanical connection comprising:
a welding or brazing of at least two pieces; and/or
an application of adhesives; and/or
a peening or press-fit stemming; and/or
a slot-groove construction, or
by shaping from one piece, or
by additive shaping.

3. The structure of claim 1, wherein:
there is essentially one connection section between the positioning pad and the shielding, or
there are essentially two connection sections between the positioning pad and the shielding, arranged on opposing sides of the positioning pad, or
there are essentially two connection sections between the positioning pad and the shielding, arranged on adjacent sides of the positioning pad, or
there are essentially three connection sections between the positioning pad and the shielding, arranged on three adjacent sides of positioning pad, or
the positioning pad and the shielding are connected over multiple connection sections distributed over at least three sides of an inner perimeter of the shielding.

4. The structure of claim 1, wherein the positioning pad and/or the shielding is integrally formed or mechanically connected with a guiding conduit, and wherein the thermocouple sensor cable is inserted or insertable into the guiding conduit.

5. The structure of claim 4, wherein the guiding conduit comprises a receiving end portion to press the thermocouple sensor cable against the surface of the structure, wherein the structure is a tube.

6. The structure of claim 1, wherein the shielding or at least a bottom side of the shielding and/or the portion of the thermocouple sensor cable which is covered by the shielding are formed straight, to match the surface of the structure when the structure is a flat object, or are formed curved, to match the surface of the structure when the structure is a pipe or curved object, and wherein the positioning pad is formed flat to match the surface of the structure when the structure is the flat object, is formed curved to match the surface of the structure when the structure is the pipe or curved object, or is formed flat to touch the surface of the structure when the structure is the pipe or curved object at a desired measuring point.

7. The structure of claim 1, wherein the thermocouple sensor cable is integrally formed with the positioning pad or the shielding.

8. The structure of claim 1, wherein the thermocouple sensor cable is detachably connected with the positioning pad.

9. The structure of claim 1, wherein the thermocouple sensor cable comprises a lock that engages with a corresponding holder of the shielding when the thermocouple sensor cable is inserted into the shielding and/or the thermocouple sensor end is secured with the positioning pad, and wherein the thermocouple sensor cable is mechanically blocked from being extracted from the shielding.

10. A method for installation of a thermocouple assembly on a surface of a structure, the method comprising:
   providing the thermocouple assembly with a sheathed thermocouple sensor cable, a positioning pad that receives a thermocouple sensor end of the thermocouple sensor cable, a shielding that covers a portion of each of the thermocouple sensor cable and the positioning pad, and an insulation body that is provided inside of the shielding;
   mechanically connecting the positioning pad to the shielding; and
   securing, at a desired position on the surface of the structure, the shielding to the surface, the shielding being secured to the surface of the structure by welding the shielding to the surface,
   wherein the shielding has at least one recessed portion and the positioning pad has at least one protruding portion that is received within the at least one recessed portion, and
   wherein the welding of the shielding to the surface of the structure produces a continuous weld along a full length of at least one side of the shielding that covers and seals the at least one recessed portion and the at least one protruding portion that is received therein.

11. The method for installation of a thermocouple assembly according to claim 10, wherein mechanically connecting the positioning pad to the shielding comprises:
   placing the positioning pad at the desired position on the surface of the structure; and
   placing the shielding on the positioning pad such that the at least one protruding portion of the positioning pad mates or engages with the at least one recessed portion of the shielding.

12. The method for installation of a thermocouple assembly according to claim 11, wherein the shielding and the positioning pad are permanently joined together by the welding.

13. The method for installation of a thermocouple assembly according to claim 10, further comprising:
   inserting the thermocouple sensor cable into the shielding; and
   introducing the thermocouple sensor end into a receiver of the positioning pad either prior to or after the placing and/or securing of the thermocouple assembly at the desired position on the surface of the structure.

14. The method for installation of a thermocouple assembly according to claim 10, wherein the thermocouple sensor cable comprises a lock that engages with a corresponding holder of the shielding, the method further comprising:
   inserting the thermocouple sensor cable into the shielding;
   introducing the thermocouple sensor end into a receiver of the positioning pad; and
   engaging the lock with the holder prior to the placing and/or securing of the thermocouple assembly at the desired position on the surface of the structure.

* * * * *